United States Patent
Fraser et al.

(10) Patent No.: US 7,861,837 B2
(45) Date of Patent: Jan. 4, 2011

(54) HYDRAULIC CLUTCH ACTUATION SYSTEM

(75) Inventors: Leigh Fraser, Bilton Rugby (GB);
James Antony Lethbridge, Leamington Spa (GB); Peter Riemer, Leamington Spa (GB); Andrew Murray Watkins, Leamington Spa (GB)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 580 days.

(21) Appl. No.: 11/437,373

(22) Filed: May 19, 2006

(65) Prior Publication Data

US 2007/0007097 A1    Jan. 11, 2007

(30) Foreign Application Priority Data

May 20, 2005    (DE)    ........................ 10 2005 023 208

(51) Int. Cl.
*F16D 48/02*    (2006.01)
*F16D 25/10*    (2006.01)

(52) U.S. Cl. ............................ 192/48.601; 192/48.609; 192/48.8; 192/85.63

(58) Field of Classification Search .................... 192/86, 192/87.11
See application file for complete search history.

(56) References Cited

U.S. PATENT DOCUMENTS

| | | | | |
|---|---|---|---|---|
| 311,123 | A * | 1/1885 | Wakasagi et al. ............... | 36/9 R |
| 2,729,940 | A * | 1/1956 | Walker .......................... | 60/390 |
| 4,795,015 | A * | 1/1989 | Hibino et al. ................... | 477/65 |
| 4,939,901 | A * | 7/1990 | Saalbach et al. ............... | 60/562 |
| 4,967,884 | A * | 11/1990 | Norcia .................... | 192/85 CA |
| 6,068,565 | A * | 5/2000 | Riemer et al. .................. | 474/18 |
| 6,102,829 | A * | 8/2000 | Muddell et al. ................ | 477/77 |
| 7,137,495 | B2 * | 11/2006 | Berger et al. ................ | 192/3.58 |
| 7,287,376 | B2 * | 10/2007 | Macht et al. .................... | 60/570 |
| 2002/0152823 | A1 * | 10/2002 | Wild et al. ...................... | 74/335 |
| 2004/0045784 | A1 | 3/2004 | Ebert et al. | |
| 2004/0231943 | A1 | 11/2004 | Berger et al. | |
| 2005/0258014 | A1 * | 11/2005 | Berger et al. ................ | 192/48.9 |
| 2007/0114105 | A1 * | 5/2007 | Fraser et al. ............... | 192/85 R |

FOREIGN PATENT DOCUMENTS

| | | |
|---|---|---|
| DE | 10103843 | 8/2002 |
| EP | 1236918 | 9/2002 |
| WO | WO 03/074909 A2 * | 9/2003 |

OTHER PUBLICATIONS

Translation of EP 1 236 918 A1, Schneider et al., Sep. 2002.*

* cited by examiner

*Primary Examiner*—Rodney H Bonck
(74) *Attorney, Agent, or Firm*—Davidson, Davidson & Kappel, LLC

(57) ABSTRACT

A hydraulic clutch actuation system is provided having a hydraulic clutch control device which includes one first clutch master cylinder that communicates via a first pressure-medium line with a first clutch slave cylinder, which is used for actuating a first clutch device, and a second clutch master cylinder that communicates via a second pressure-medium line with a second clutch slave cylinder used for actuating a second clutch device, the pressure prevailing in the first and/or in the second pressure-medium line being relievable via at least one emergency release valve device to permit disengagement of at least one of the clutch devices in an emergency situation. The emergency release valve device includes a 4/2-way directional control valve which has a connection for the first pressure-medium line, a connection for the second pressure-medium line, a connection for a first pressure-relief line, which is connectable via the 4/2-way directional control valve to the first pressure-medium line, and a connection for a second pressure-relief line, which is connectable via the 4/2-way directional control valve to the second pressure-medium line.

3 Claims, 7 Drawing Sheets

HYDRAULIC CLUTCH ACTUATION SYSTEM

This application claims the benefit of German Patent Application No. 10 2005 023 208.6 filed May 20, 2005 and hereby incorporated by reference herein.

CROSS REFERENCE TO RELATED APPLICATION

This application is related to co-pending U.S. patent application Ser. No. 11/433,928 filed on May 15, 2006 entitled HYDRAULIC CLUTCH ACTUATION SYSTEM.

BACKGROUND

The present invention relates to a hydraulic clutch actuation system having a hydraulic clutch control device which includes a first clutch master cylinder that communicates via a first pressure-medium line with a first clutch slave cylinder used for actuating a first clutch device, and a second clutch master cylinder that communicates via a second pressure-medium line with a second clutch slave cylinder used for actuating a second clutch device, the pressure prevailing in the first and/or in the second pressure-medium line being relievable via at least one emergency release valve device to permit disengagement of at least one of the clutch devices in an emergency situation.

The clutch devices are preferably friction clutches. The hydraulic clutch actuation system is also described as a hydraulic clutch-release system, which includes manually or automatically actuated master cylinders and slave cylinders that disengage the clutches. In the case of so-called external pressure-operated clutches, the clutch is disengaged in the force-free state of the clutch, and the frictional engagement for connecting an internal combustion engine and a transmission is accomplished by actuation of the slave cylinder and holding the same under pressure via the master cylinder. For twin clutches, in particular, in which a shared input part branches off to two output parts, each having one transmission input shaft, this type of clutch actuation is advantageous. Should both or one of the clutch control devices, also described as clutch release devices, fail, for example due to loss of pressurizing medium, then these clutches remain disengaged and do not lock up the transmission, as do clutches, for example, which are normally engaged in the force-free state. In addition to their use in manually operated transmissions, friction clutches of the mentioned type are typically used in automated transmissions, such as in automated manual transmissions (AMT) or twin-clutch transmissions (TCT), which are generally controlled by a control unit, the clutch operation, as well as engagement and disengagement of the gears being automated. In the event that a control unit of this kind fails, depending on the control strategy being used, the situation can arise that the clutch position of one clutch, respectively in a twin-clutch transmission, of both clutches, freezes, with the result that the operation of the internal combustion engine can no longer be controlled independently of the transmission output speed and, thus, of the wheel speed, i.e., in the case of a vehicle at standstill, it is no longer possible to operate the internal combustion engine in order to sustain auxiliary systems. For example, in the event of failure of the transmission control, the pressure prevailing in the first and/or in the second pressure-medium line can be relieved by an emergency release valve device in order to disconnect a clutch that no longer disengages.

SUMMARY OF THE INVENTION

An object of the present invention is to devise a simple and cost-effective hydraulic clutch actuation system having a hydraulic clutch control device which includes a first clutch master cylinder that communicates via a first pressure-medium line with a first clutch slave cylinder used for actuating a first clutch device, and a second clutch master cylinder that communicates via a second pressure-medium line with a second clutch slave cylinder used for actuating a second clutch device, the pressure prevailing in the first and/or in the second pressure-medium line being relievable via at least one emergency release valve device to permit disengagement of at least one of the clutch devices in an emergency situation.

The present invention provides a hydraulic clutch actuation system having a hydraulic clutch control device which includes a first clutch master cylinder that communicates via a first pressure-medium line with a first clutch slave cylinder used for actuating a first clutch device, and a second clutch master cylinder that communicates via a second pressure-medium line with a second clutch slave cylinder used for actuating a second clutch device, the pressure prevailing in the first and/or in the second pressure-medium line being relievable via at least one emergency release valve device to permit disengagement of at least one of the clutch devices in an emergency situation, in that the emergency release valve device includes a 4/2-way directional control valve which has a connection for the first pressure-medium line, a connection for the second pressure-medium line, a connection for a first pressure-relief line, which is connectable via the 4/2-way directional control valve to the first pressure-medium line, and a connection for a second pressure-relief line, which is connectable via the 4/2-way directional control valve to the second pressure-medium line. This makes it possible in a simple manner to relieve both pressure-medium lines simultaneously into one single hydraulic accumulator which has a lower pressure than the pressure-medium lines. An electromagnet is preferably used for actuating the 4/2-way directional control valve.

The present invention also provides a hydraulic clutch actuation system having an emergency release valve device that includes two 2/2-way directional control valves which each have one connection for one of the pressure-medium lines and one connection for one of the pressure-relief lines that is connectable via the particular 2/2-way directional control valve to the corresponding pressure-medium line. By employing the two separate 2/2-way directional control valves, it is possible to selectively relieve the pressure in one of the pressure-medium lines or in both pressure-medium lines.

The present invention also provides a hydraulic clutch actuation system having an emergency release valve device that includes a 2/2-way directional control valve which has a shared connection for both pressure-medium lines and one connection for a pressure-medium line which is connectable via the 2/2-way directional control valve to the two pressure-medium lines. The advantage of this approach is that the design complexity may be kept to a minimum.

One preferred exemplary embodiment of the hydraulic clutch actuation system provides for a nonreturn valve to be installed in each of the pressure-medium lines in such a way that pressure equalization among the pressure-medium lines may be prevented. In particular, the two nonreturn valves may prevent any equalization of pressure via the shared connection of the 2/2-way directional control valve.

BRIEF DESCRIPTION OF THE DRAWINGS

Further advantages and features of the present invention and details pertaining thereto are derived from the following description in which various exemplary embodiments are explained in detail with reference to the drawing. In each case, the features delineated in the claims and the specification may be essential to the present invention, either alone or in any combination. In the accompanying drawing, the figures show:

DETAILED DESCRIPTION OF THE PREFERRED EMBODIMENTS

Figure 1:
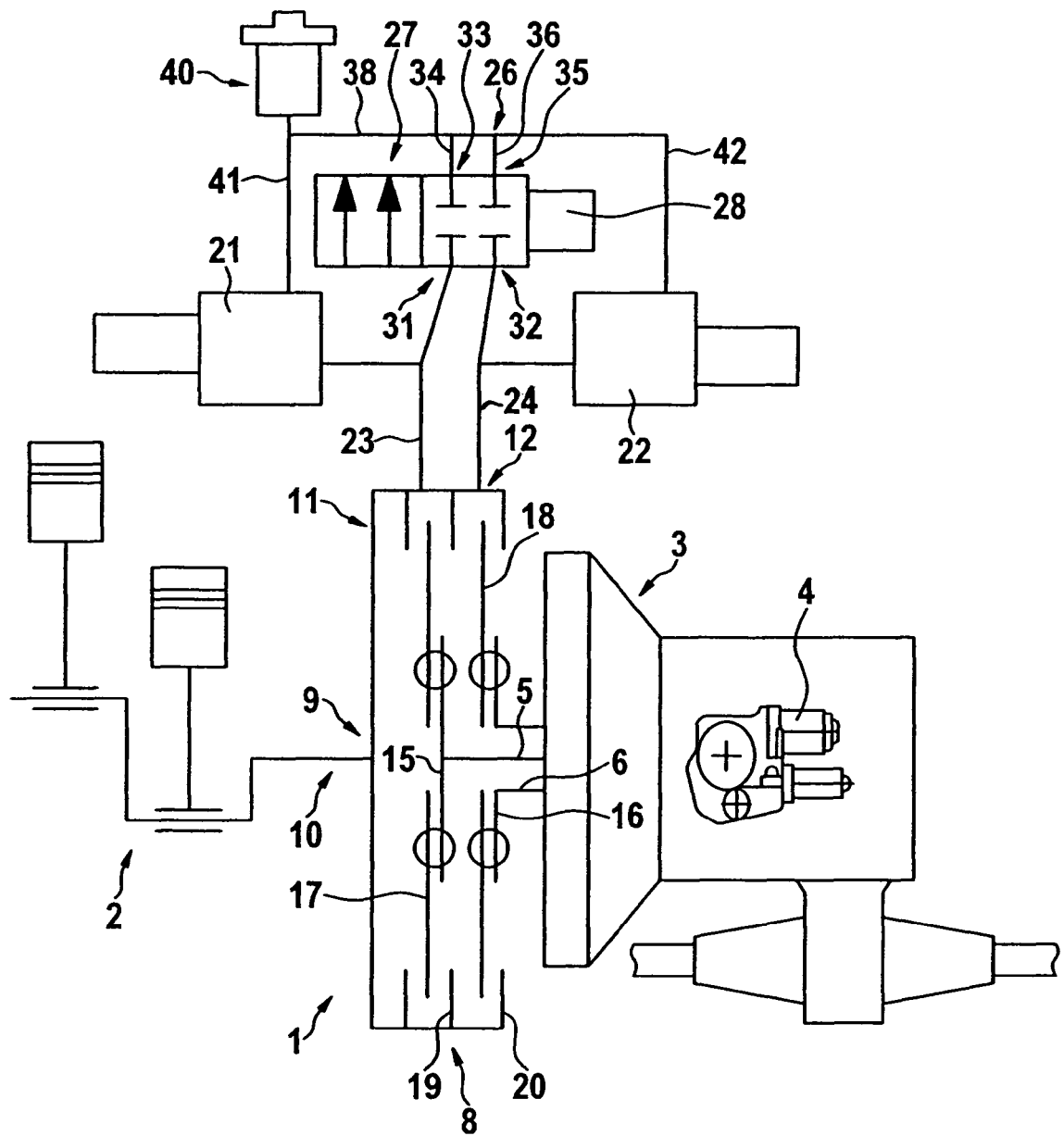
FIG. 1 a schematic representation of a drivetrain of a motor vehicle having a hydraulic clutch actuation system which includes an emergency release valve device having a 4/2-way directional control valve.

FIG. 1 through 7 each show a schematically illustrated drivetrain 1 of a motor vehicle. For the sake of clarity, all of the individual parts of the drivetrain are provided with reference numerals in FIG. 1 only. To improve the legibility of the drawing, only the essential reference numerals are specified in FIG. 2 through 7. The following detailed description of FIG. 1 applies to FIG. 2 through 7 as well. To avoid repetitive explanations, the complete description of the entire drivetrain is not repeated in the detailed description of FIG. 2 through 7. Instead, essentially only the differences among the exemplary embodiments illustrated in FIG. 1 through 7 are discussed.

A drivetrain 1 of a motor vehicle is schematically illustrated in FIG. 1. Drivetrain 1 includes an internal combustion engine 2, which has a downstream transmission 3 that is designed as a twin-clutch transmission having two transmission input shafts 5, 6. Located in the power flow between internal combustion engine 2 and transmission 3 is a twin clutch 8 having an input part 9 which is nonrotationally connected to a crankshaft 10 of internal combustion engine 2. Twin clutch 8 includes a first clutch device 11 and a second clutch device 12. The two clutch devices 11 and 12 are preferably designed as friction clutches. In this context, the design and function of a twin clutch having two friction clutches are assumed to be known.

Twin clutch 8 includes two output parts 15, 16, which are each nonrotationally connected to one of transmission input shafts 5, 6. Output parts 15, 16 are each coupled via torsional-vibration dampers to a clutch disk 17, 18. Clutch disks 17, 18 have friction linings which may be brought into frictional engagement with input part 9 of twin clutch 8.

To that end, input part 9 has an axially fixed pressure plate having frictional engagement surfaces on both sides and is nonrotationally connected to axially displaceable annular disk parts 19, 20, which are each provided for one output part, are connected to input part 9, and each have a frictional engagement surface. The frictional engagement with the friction surfaces of output parts 15, 16, respectively of clutch disks 17, 18, is produced by the axial displacement of annular disk parts 19, 20. In the force-free state, the annular surfaces are spaced apart from the pressure plate by leaf springs in such a way that no frictional engagement occurs, i.e., both clutches 11, 12 assigned to output parts 15, 16 are external-pressure operated clutches.

Clutches 11, 12 are each engaged by an axial displacement of release or actuation levers. In this context, the release or actuation levers are held in this state with the aid of clutch control devices until a clutch disengagement is desired. An adjusting device may be provided for both clutches 11, 12, one single shared adjusting device being able to act on both clutches. Along the lines of the present invention, it is understood that other clutch forms and embodiments may also be advantageous, such as clutches which in their force free state are engaged, for example.

The two friction clutches 11, 12 are actuated by clutch release or actuation devices, which each cooperate with a slave cylinder designed, for example, as an annular cylinder disposed concentrically about transmission input shafts 5, 6. The slave cylinders each communicate via pressure-medium lines 23, 24 with a master cylinder 21, 22. Master cylinders 21, 22 are each actuated, for example, by an electric actuator.

Depending on the particular need, preferably in the case of an emergency, the pressure prevailing in pressure-medium lines 23, 24 may be quickly reduced via an emergency release valve device 26, which is also described as a pressure-relieving device. Emergency release valve device 26 is externally controlled by the driver, for example. To this end, the driver may have a control device which is constituted, for example, of a selector lever for selecting operating programs of the motor vehicle.

Transmission 3 is actuated, for example, by a transmission actuator 4, which is controlled, in turn, via a transmission control unit. If, in an emergency situation, the transmission control unit fails, then master cylinders 21, 22 remain in their momentary position. As a result, clutches 11, 12 remain in frictional engagement, depending on the position of the corresponding actuating devices. At this point, to enable internal combustion engine 2 to be decoupled from transmission 3, the driver activates the actuating device for emergency release valve device 26, thereby actuating emergency release valve device 26, so that the pressure that has built up in pressure-medium lines 23, 24 is reduced, and clutches 11, 12 are disengaged.

In FIG. 1, emergency release valve device 26 includes a 4/2-way directional control valve 27, which is actuated by an electromagnet 28. 4/2-way directional control valve 27 includes a connection 31 for pressure-medium line 23 and a connection 32 for pressure-medium line 24. On the opposite side, 4/2-way directional control valve 27 has a connection 33 for a pressure-relief line 34 which is connectable via 4/2-way directional control valve 27 to pressure-medium line 23. In addition, 4/2-way directional control valve 27 has a connection 35 for a pressure-relief line 36 which is connectable via 4/2-way directional control valve 27 to pressure-medium line 24. In the position of 4/2-way directional control valve 27 shown in FIG. 1, the connections between pressure-medium lines 23, 24 and pressure-relief lines 34, 36 are interrupted or closed. When 4/2-way valve 27 is switched over to its second position (not shown in FIG. 1), then a connection is opened between pressure-medium lines 23, 24 and the corresponding pressure-relief lines 34, 36, respectively, making it possible to quickly reduce the pressure in pressure-medium lines 23, 24.

Pressure-relief lines 34, 36 communicate via another pressure-relief line 38 with a hydraulic accumulator 40, which is also described as a replenishing reservoir 40 and which has a significantly lower pressure than pressure-medium lines 23 and 24.

In addition, hydraulic accumulator 40 communicates via a connecting line 41, which is also described as a replenishing line, with master cylinder 21. Hydraulic accumulator 40 also communicates via a connecting line 42, which is also described as a replenishing line, with master cylinder 22.

Figure 2:
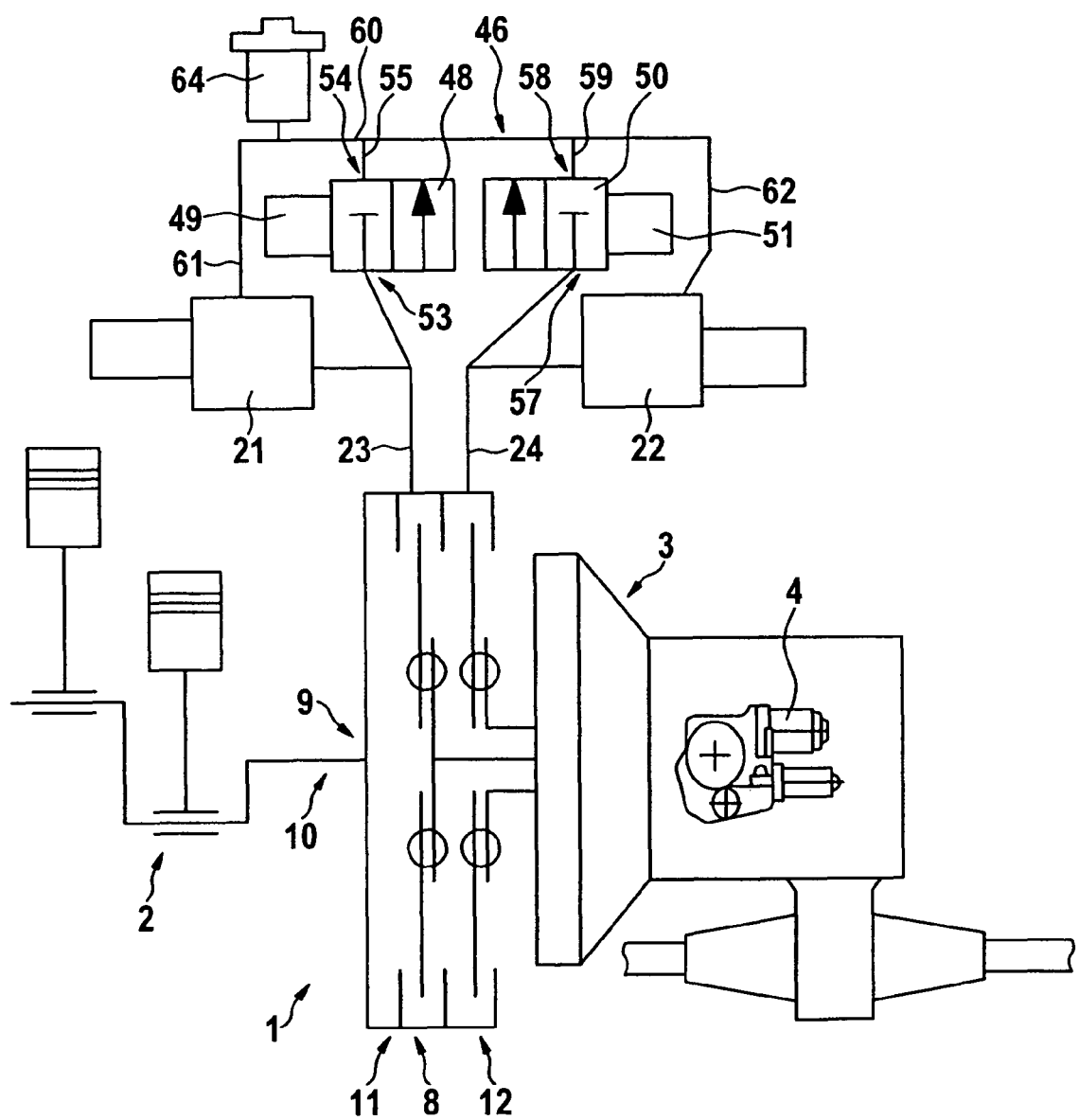
FIG. 2 a schematic representation of a drivetrain of a motor vehicle having a hydraulic clutch actuation system which includes an emergency release valve device having two 2/2-way directional control valves.

In the exemplary embodiment shown in FIG. 2, the hydraulic clutch actuation system includes an emergency release valve device 46 having a first 2/2-way directional control valve 48 that is actuatable by an electromagnet 49 and having a second 2/2-way directional control valve 50 that is actuatable by an electromagnet 51. 2/2-way directional control valve 48 has a connection 53 for pressure-medium line 23. On the opposite side, 2/2-way directional control valve 48 has a connection 54 for a pressure-relief line 55. Similarly, 2/2-way directional control valve 50 has a connection 57 for pressure-medium line 24. On the opposite side, 2/2-way directional control valve 50 has a connection 58 for a pressure-relief line 59. Pressure-relief lines 55 and 59 communicate via a connecting line 60 with a hydraulic accumulator 64. Hydraulic accumulator 64 communicates via a connecting line 61, which is also described as a replenishing line, with master cylinder 21. In addition, hydraulic accumulator 64 communicates via connecting line 60 and a connecting line 62 with master cylinder 22.

Figure 3:
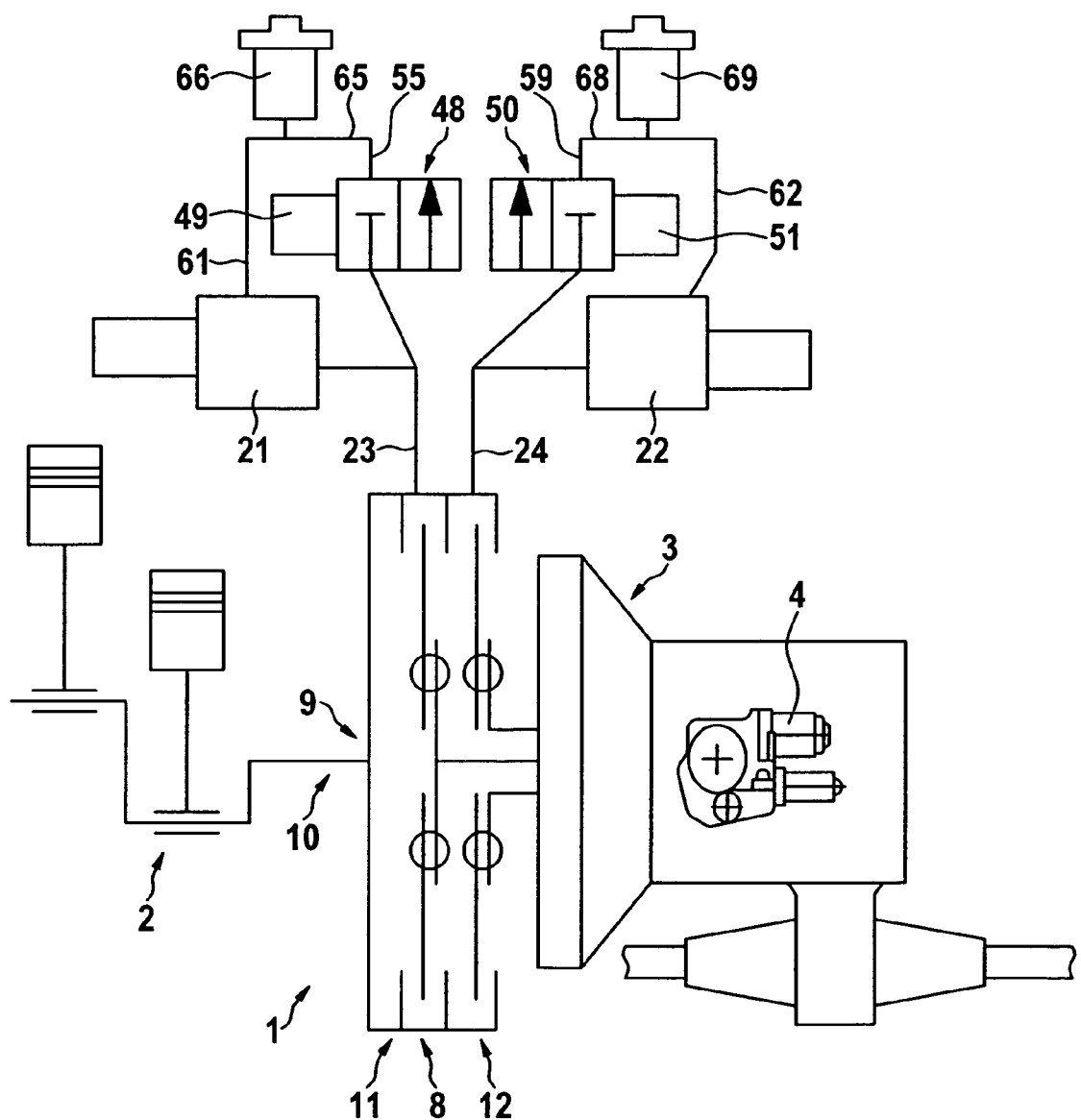
FIG. 3 a schematic representation of a drivetrain of a motor vehicle having a hydraulic clutch actuation system which includes an emergency release valve device having two 2/2-way directional control valves which communicate with different hydraulic accumulators.

In the hydraulic clutch actuation system shown in FIG. 3, 2/2-way directional control valve 48 is connected via pressure-relief line 55 and a connecting line 65 to a hydraulic accumulator 66, which also communicates via connecting line 61 with master cylinder 21. 2/2-way directional control valve 50 is connected via pressure-relief line 59 and a connecting line 68 to another hydraulic accumulator 69, which also communicates via connecting line 62 with master cylinder 22.

Figure 4:
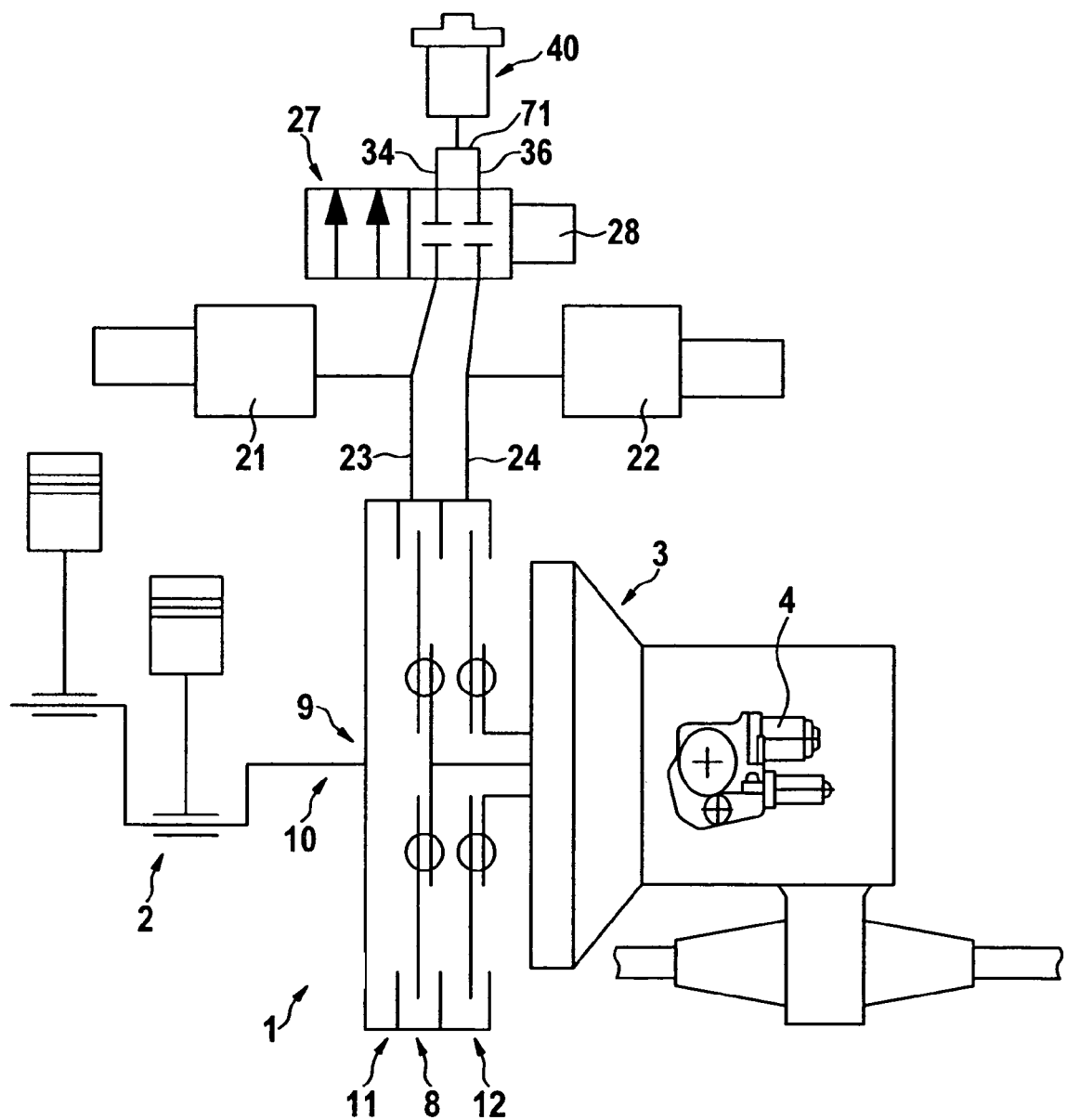
FIG. 4 a schematic representation of a drivetrain of a motor vehicle having a hydraulic clutch actuation system which includes an emergency release valve device having one 4/2-way directional control valve which communicates with one single hydraulic accumulator.

The exemplary embodiment illustrated in FIG. 4 is similar to that of FIG. 1. 4/2-way directional control valve 27 is connected via pressure-relief lines 34 and 36 and a connecting line 71 to hydraulic accumulator 40. However, in the exemplary embodiment shown in FIG. 4, hydraulic accumulator 40 does not communicate via connecting lines (41 and 42 in FIG. 1) with master cylinders 21 and 22.

Figure 5:
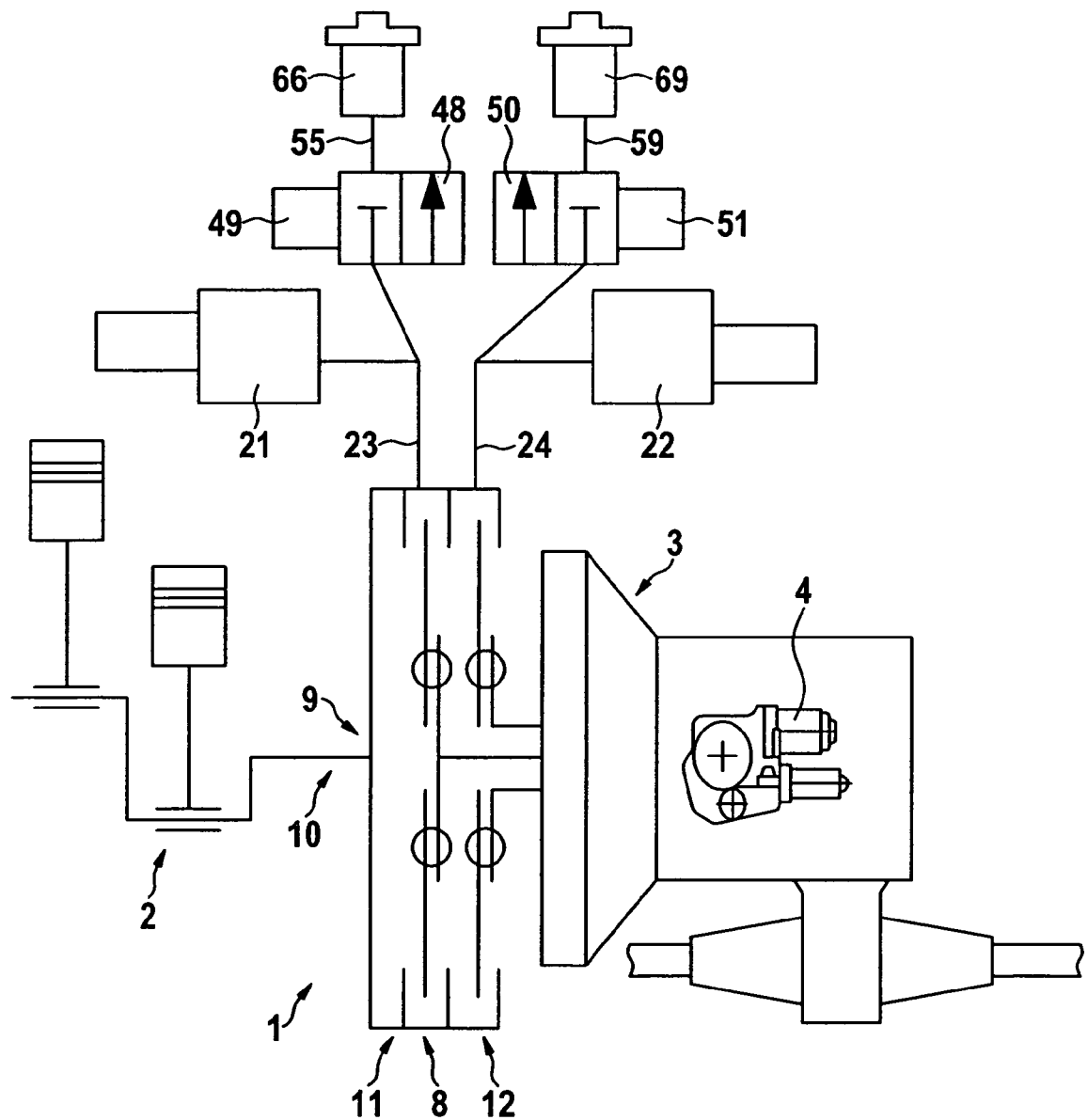
FIG. 5 a schematic representation of a drivetrain of a motor vehicle having a hydraulic clutch actuation system which includes an emergency release valve device having two 2/2-way directional control valves which each communicate with one hydraulic accumulator.

The exemplary embodiment illustrated in FIG. 5 is similar to that of FIG. 3. However, in the exemplary embodiment shown in FIG. 5, hydraulic accumulators 66 and 69 do not communicate with master cylinders 21 and 22. Thus, in comparison to the exemplary embodiment shown in FIG. 3, the connecting lines (61 and 62 in FIG. 3) between master cylinders 21 and 22 and hydraulic accumulators 66 and 69 are omitted.

Figure 6:
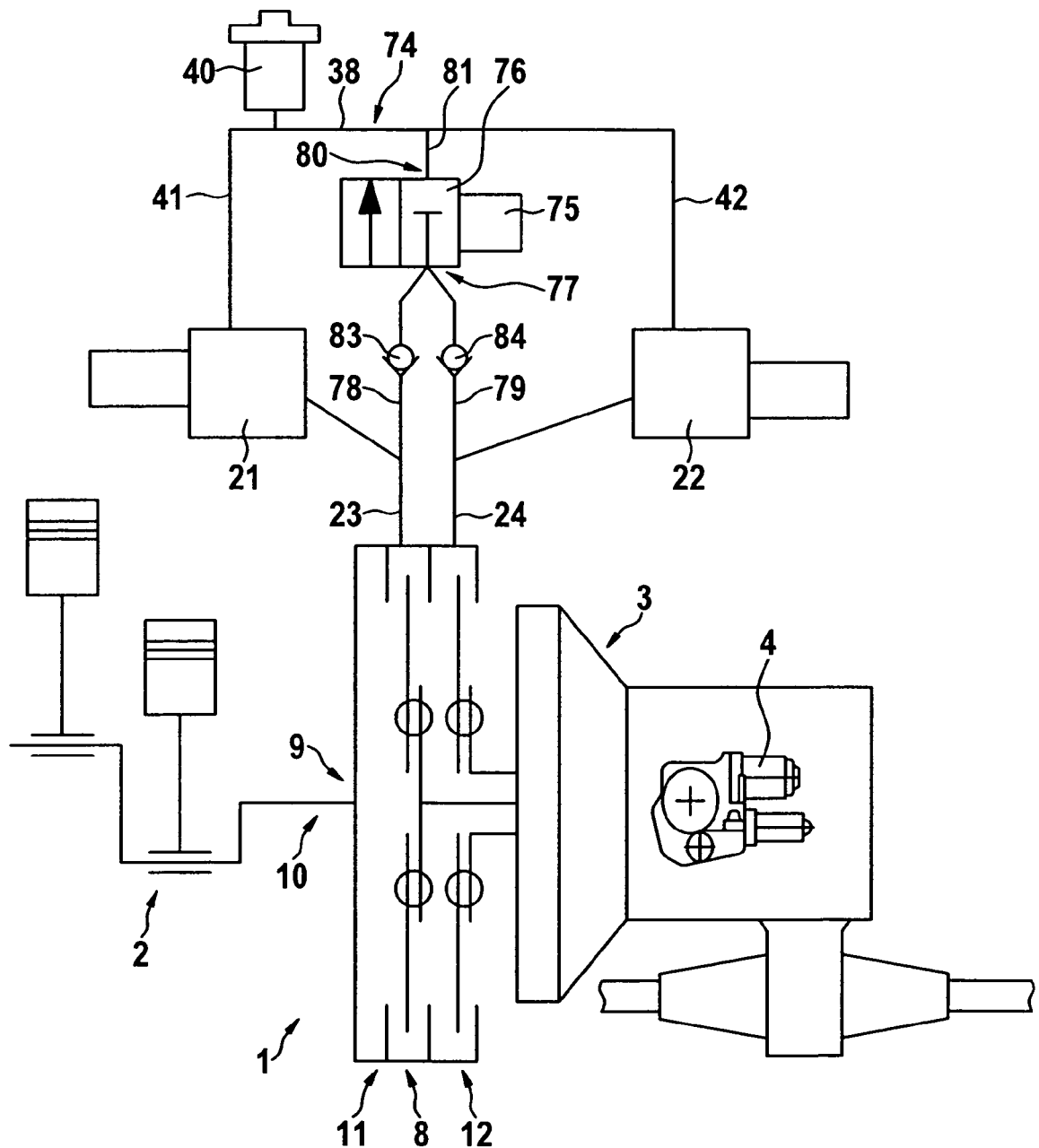
FIG. 6 a schematic representation of a drivetrain of a motor vehicle having a hydraulic clutch actuation system which includes an emergency release valve device having one 2/2-way directional control valve which has one shared connection for two pressure-medium lines.

The hydraulic clutch actuation system shown in FIG. 6 includes an emergency release valve device 74 having a 2/2-way directional control valve 76 that is actuatable by an electromagnet 75. 2/2-way directional control valve 76 has a shared connection 77 for two branch lines 78 and 79. Branch line 78 originates at pressure-medium line 23. Branch line 79 originates at pressure-medium line 24. On the opposite side, 2/2-way directional control valve 76 has a connection 80 for a connecting line 81 which communicates via pressure-relief line 38 with hydraulic accumulator 40.

Branch line 78 features a nonreturn valve 83 which prevents a backflow of medium into pressure-medium line 23. Similarly, branch line 79 features a nonreturn valve 84 which prevents a backflow of medium into pressure-medium line 24.

Figure 7:
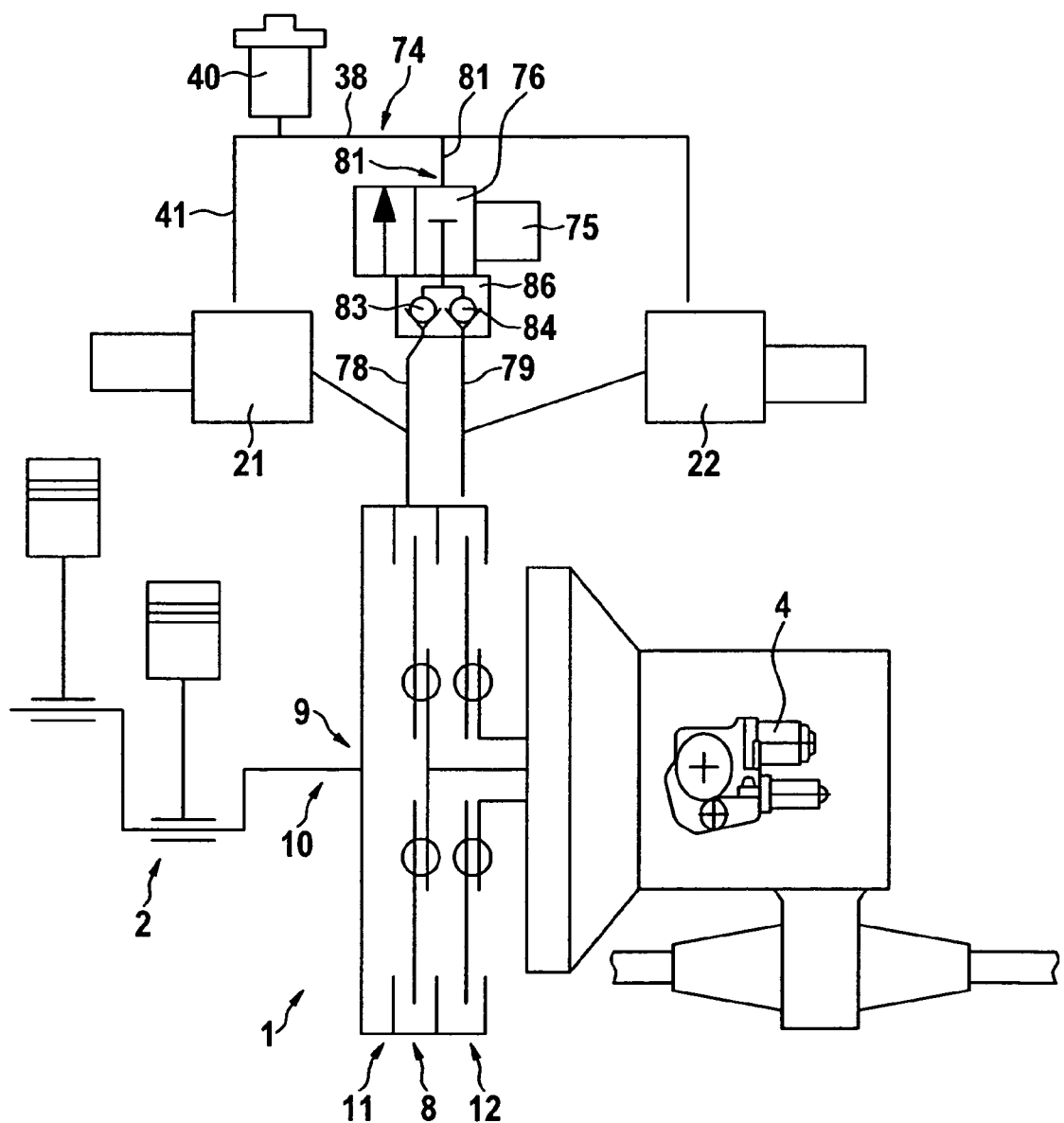
FIG. 7 a schematic representation of a drivetrain of a motor vehicle having a hydraulic clutch actuation system which includes an emergency release valve device having a 2/2-way directional control valve in which two nonreturn valves are integrated.

The exemplary embodiment illustrated in FIG. 7 is similar to that of FIG. 6. In contrast to the exemplary embodiment shown in FIG. 6, in the exemplary embodiment illustrated in FIG. 7, the two nonreturn valves 83 and 84 are combined with 2/2-way directional control valve 76, as indicated by a frame structure 86 adjoining 2/2-way directional control valve 76.

LIST OF REFERENCE NUMERALS 1. drivetrain
2. internal combustion engine
3. transmission
4. transmission actuator
5. transmission input shaft
6. transmission input shaft
8. twin clutch
9. input part
10. crankshaft
11. first clutch device
12. second clutch device
15. output part
16. output part
17. clutch disk
18. clutch disk
19. annular disk part
20. annular disk part
21. master cylinder
22. master cylinder
23. pressure-medium line
24. pressure-medium line
26. emergency release valve device
27. 4/2-way directional control valve
28. electromagnet
31. connection
32. connection
33. connection
34. pressure-relief line
35. connection
36. pressure-relief line
38. pressure-relief line
40. hydraulic accumulator
41. connecting line
42. connecting line
46. emergency release valve device
48. 2/2-way directional control valve
49. electromagnet
50. 2/2-way directional control valve
51. electromagnet
53. connection
54. connection 55. pressure-relief line
57. connection
58. connection
59. pressure-relief line
60. connecting line
61. connecting line
62. connecting line
64. hydraulic accumulator
65. connecting line
66. hydraulic accumulator
68. connecting line
69. hydraulic accumulator
71. connecting line
74. emergency release valve device
75. electromagnet
76. 2/2-way directional control valve
77. connection
78. branch line
79. branch line
80. connection
81. connecting line
83. nonreturn valve
84. nonreturn valve
86. frame structure

What is claimed is:

1. A hydraulic clutch actuation system comprising:
a hydraulic clutch control device including a first clutch master cylinder communicating via a first pressure-medium line with a first clutch slave cylinder used for actuating a first clutch device, and a second clutch master cylinder communicating via a second pressure-medium line with a second clutch slave cylinder used for actuating a second clutch device; and
at least one emergency release valve device capable of relieving the pressure prevailing in the first or second pressure-medium lines to permit disengagement of at least one of the first and second clutch devices in an emergency situation, the emergency release valve device including:
a 4/2-way directional control valve,
the control valve having a connection for coupling to the first pressure-medium line, a connection for coupling to the second pressure-medium line, a connection for a first pressure-relief line, and a connection for a second pressure-relief line,
the first pressure relief line being connectable via the 4/2-way directional control valve to the first pressure-medium line,
the second pressure relief line being connectable via the 4/2-way directional control valve to the second pressure-medium line, and
the control valve including an actuator disconnecting both the first pressure relief line from the first pressure-medium line and the second pressure relief line from first pressure-medium line in a first switching position and connecting both the first pressure relief line to the first pressure-medium line and the second pressure relief line to the first pressure-medium line in a second switching position.

2. A hydraulic clutch actuation system comprising:
a hydraulic clutch control device including a first clutch master cylinder communicating via a first pressure-medium line with a first clutch slave cylinder used for actuating a first clutch device, and a second clutch master cylinder communicating via a second pressure-medium line with a second clutch slave cylinder used for actuating a second clutch device; and
at least one emergency release valve device capable of relieving pressure prevailing in the first or second pressure-medium line to permit disengagement of at least one of the first and second clutch devices in an emergency situation, the emergency release valve device including a 2/2-way directional control valve, the control valve having a shared connection for coupling to the first and second pressure-medium lines and one connection for relieving pressure being connectable via the 2/2-way directional control valve to the first and second pressure-medium lines.

3. The hydraulic clutch actuation system as recited in claim 2 further comprising a first nonreturn valve installed between the first pressure-medium line and the shared connection of the 2/2-way directional control valve and a second nonreturn valve installed between the second pressure-medium line and the shared connection of the 2/2 way directional control valve, for preventing an equalization of pressure among the first and second pressure-medium lines.

* * * * *